United States Patent
Song et al.

(10) Patent No.: US 7,376,136 B2
(45) Date of Patent: May 20, 2008

(54) GTC FRAME STRUCTURE AND METHOD FOR TRANSMISSION OF ONT MANAGEMENT CONTROL INFORMATION IN GPON

(75) Inventors: Jae-Yeon Song, Seongnam-si (KR); Se-Youn Lim, Seoul (KR); Jin-Hee Kim, Suwon-si (KR); Seo-Won Kwon, Suwon-si (KR); Yoon-Sun Lee, Seoul (KR); Jong-Hwa Lee, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 801 days.

(21) Appl. No.: 10/803,643

(22) Filed: Mar. 18, 2004

(65) Prior Publication Data

US 2004/0208631 A1 Oct. 21, 2004

(30) Foreign Application Priority Data

Apr. 15, 2003 (KR) ...................... 10-2003-0023754

(51) Int. Cl.
*H04L 12/28* (2006.01)

(52) U.S. Cl. ...................................... 370/392; 370/389
(58) Field of Classification Search ................ 370/389, 370/392, 393, 395.1, 395.51, 471, 474, 475; 398/45–46, 49–51, 58, 66, 70
See application file for complete search history.

(56) References Cited

U.S. PATENT DOCUMENTS

| 2003/0219015 A1* | 11/2003 | Constant Six et al. ...... 370/389 |
| 2004/0017823 A1* | 1/2004 | Kim et al. .................. 370/466 |
| 2004/0120326 A1* | 6/2004 | Yoon et al. ............ 370/395.53 |

* cited by examiner

*Primary Examiner*—Brenda Pham
(74) *Attorney, Agent, or Firm*—Cha & Reiter, LLC

(57) ABSTRACT

A GTC frame Structure and a method for transmission of ONT management control information in GPON. The method comprises the steps of: constructing a GTC frame which includes a PCBd portion having an OMCC field including either destination identifier information for supporting a GEM mode or destination identifier information for supporting a ATM mode, and a payload portion including data; and transmitting the GTC frame. The GTC frame structure for ONT management control information transmission can transmit the management control information to an ONT supporting either ATM mode or GEM mode.

21 Claims, 5 Drawing Sheets

| ATM HEADER (301) | Transaction Correlation Identifier (302) | MESSAGE TYPE (303) | DEVICE IDENTIFIER (304) | MESSAGE IDENTIFIER (305) | MESSAGE CONTENTS (306) | AAL5 TRAILER (307) |
|---|---|---|---|---|---|---|

GTC FRAME STRUCTURE AND METHOD FOR TRANSMISSION OF ONT MANAGEMENT CONTROL INFORMATION IN GPON

CLAIM OF PRIORITY

This application claims priority to an application entitled "GTC frame Structure and method for transmission of ONT management control information in GPON," filed in the Korean Intellectual Property Office on Apr. 15, 2003 and assigned Serial No. 2003-23754, the contents of which are hereby incorporated by reference.

BACKGROUND OF THE INVENTION

1. Field of the Invention

The present invention relates to an Optical Network Terminal (ONT) management control protocol of a Gigabit-capable passive optical network (hereinafter, referred to as GPON).

2. Description of the Related Art

In order to construct a subscriber network spanning from a telephone office to a building or a house, there have recently been proposed various network structures and progress schemes. For instance, a x-digital subscriber line (XDSL), a hybrid fiber coax (HFC), a fiber to the building (FTTB), a fiber to the curb (FTTC), or a fiber to the home (FTTH) have been proposed. From among these structures, an FTTx (x represents B, C, or H) structure may be classified into an active FTTx structure which is realized by construction of an active optical network (hereinafter, referred to as AON) and a passive FTTx structure which is realized by construction of a passive optical network (hereinafter, referred to as a PON).

A PON, which is employed for realizing a passive FTTx, has a point-to-multipoint topology by passive elements, and it is proposed as a scheme for realizing an economic subscriber network. In other words, in the PON, one optical line termination (hereinafter, referred to as an OLT) is connected to a plurality of optical network units (hereinafter, referred to as ONUs) by means of an optical distribution network (hereinafter, referred to as an ODN) of 1×N, so that a distributed topology with a tree structure is formed.

A first type of PON developed and standardized was an asynchronous transfer mode passive optical network (hereinafter, referred to as an ATM-PON), and the standardization contents are written in the ITU-T G.982, ITU-T G.983.1 and ITU-T G983.3 drawn up by the international telecommunication union's telecommunication section (ITU-T). At present, a GPON standardization is being developed by the ITU-T.

FIG. 1 is a block diagram of a conventional PON. Generally, the PON includes one OLT and a plurality of ONUs. FIG. 1 shows an example in which one OLT 10 is connected to three ONUs 12a to 12c through an ODN 16.

Referring to FIG. 1, the OLT 10 is located at a root of tree structure. More importantly, the OLT plays a central role in providing information to subscribers in an access network. This OLT 10 is connected to the ODN 16. Herein, the ODN 16 has a tree topology structure and distributes a downstream data frame, which is transmitted from the OLT 10, to the ONUs 12a to 12c. Furthermore, the ODN 16 multiplexes upstream data frames from the ONUs 12a to 12c and transmits the multiplexed frame to the OLT 10. Also, the ONUs 12a to 12c receives the downstream data frame, provides it to end users 14a to 14c, and then transmits data output from the end users 14a to 14c to the OLT 10 through the ODN 16 as upstream data frames. Herein, each of the end users 14a to 14c connected to the each of the ONUs 12a to 12c represents various types of terminating equipment of a subscriber network that can be used in a PON including network terminals (NTs).

Generally, in an ATM-PON, there are ATM cells, each of which has a size of 53 bytes, that are transmitted upward or downward in the form of frames each consisting of a predetermined number of ATM cells. In a tree type PON structure as shown in FIG. 1, the OLT 10 properly inserts downstream cells in a downstream frame, and then the downstream cells are distributed to each of the ONUs 12a to 12c.

Furthermore, in the case of upstream transmission, the OLT 10 accesses data are transmitted from the ONUs 12a to 12c by means of a time division multiplexing (TDM) method. The ODN 16, which is connected between the OLT 10 and the ONUs 12a to 12c, is a passive device, and the OLT 10 prevents data from colliding in the ODN 16 by means of a virtual distance correction algorithm called "ranging".

Additionally, in order to maintain security when downstream data transmission is performed from the OLT 10 to the ONUs 12a to 12c, the OLT 10 and the ONUs 12a to 12c can send or receive from each other a code key for an encryption and an operations, administration and maintenance (OAM) message for maintenance. For such purposes, each frame in upstream or downstream transmission has a corresponding data field arranged in a dedicated ATM cell or a general ATM cell, by which a message can be sent or received at predetermined intervals.

FIG. 2 is a view showing a protocol stack structure of a conventional GPON. Referring to FIG. 2, the protocol stack of the GPON includes a protocol layer 100 which interfaces with an upper layer, a GTC layer 200, and a GPON physical media dependent (GPM) layer 300. The protocol layer 100 comprises an ATM client 110, an ONT management control interface (hereinafter, referred to as an OMCI) 120, a GEM client 130, and a physical layer operation administration maintenance (PLOAM) module 140.

In the GPON protocol having this conventional structure, the GTC layer 200 converts upper frames into a GTC frame and then transmits the frame. Herein, the ATM client 110 supports a transmission method of an ATM mode, and the GEM client 130 supports a transmission method of an GEM mode.

The ATM client 110 fits transmission data to the GTC frame by the unit of a cell with a fixed length. In this case, if there is a portion that has a length shorter than a length of a cell (typically, 53 bytes) in the GTC frame, the ATM client 110 then fits the transmission data into the next frame and then transmits the frame. Accordingly, a cell is not divided in the ATM mode.

However, since a GEM frame is a packet that can have various lengths, when the GEM client 130 fits the GEM frame to the GTC frame, the GEM client 130 may divide the GEM frame and then transmits the divided frame, for efficient use of bandwidths.

For example, when the GEM client 130 receives user data from an upper layer, the GEM client 130 receives information (e.g. length) about the GTC frame, which is standing by, from the GTC layer 200, divides the user data on the basis of the information, and generates a plurality of GEM frames. Otherwise, the GEM client 130 does not divide the user data, generates one GEM frame, and then transmits the GEM frame to the GTC layer 200. The GTC layer 200 then fits the GEM frame to a GTC frame that is standing by and transmits the frame.

Also, the reception side reassembles the divided GEM frame and then transmits the frame to an upper layer.

In the prior art, there is an ONT management control protocol for a BPON. The BPON operates on the basis of an ATM as defined by the G.983.1. Further, the G.983.2 defines an ONT management control interface of the BPON. This BPON also operates on the basis of the ATM. The G.983.2 defines an ATM cell-based frame structure which can transmit the management control information.

FIG. 3. is a view showing a structure of a frame transmitting ONT management control information of a BPON defined by the G.983.2. Hereinafter, the frame constructed by fields will be in detail described.

First, an ATM header 301 represents a virtual path identifier (VPI) and a virtual channel identifier (VCI). both which are channel addresses for management control.

Then, there is a transaction correlation identifier 302 that represents a relationship between a request message and a response message.

Further, a message type 303 represents the types of messages that can be sent/received.

Further, a device identifier 304 represents a system (0x0A) based on the ITU-T G.983.1

Further, a message identifier 305 represents a managed entity and a managed entity instance.

Further, a message contents 306 represents the contents of a message defined by the message type 303.

FIG. 4. is a view showing a structure of a frame in a conventional GEM mode supporting a TDM and Ethernet service, in which only a structure for a TDM frame or an Ethernet frame is defined.

Referring to FIG. 4, the GEM frame generally includes a payload length identifier (hereinafter, referred to as a PLI) (L) (16 bits) 410, a Port ID (12 bits) 420, a frag (two bits) 430, a FFS (two bits) 440, a HEC (16 bits) 450, and a fragment payload (L byte) 460. Herein, the PLI 410, the Port ID 420, the frag 430, the FFS 440, and the HEC 450 are included in a GEM header.

The PLI 410 is a field for representing a length of a payload, and the Port ID 420 is a field for dividing traffic in order to provide a traffic multiplexing. Further, the Frag 430 is a field for representing division state of a payload, and the FFS 440 is a field for detecting and correcting a header error. The FFS 440 is an undecided field.

In the prior art, the two bits of the Frag 430 from among the GEM frame header is used to determine whether or not a currently transmitted GEM payload is a divided frame. For instance, the Frag 430 in an undivided GEM frame may be set as "11", the Frag 430 in a start frame of a divided GEM frame may be set as "10", the Frag 430 in a medium frame of the divided GEM frame may be set as "00", and the Frag 430 in a last frame of the divided GEM frame may be set as "01", so that, whether or not a predetermined GEM frame is a divided frame, or one of the divided frames which corresponds to the predetermined GEM frame can be indicated.

Also, in a GPON which is being standardized by the ITU-T, one OLT communicates with a plurality of ONT (ONU). Herein, the OLT supplies both an ATM mode and a GEM mode, and it selectively can transmit. However, it has been defined that the ONT (ONU) supplies only one mode. Further, the OLT needs an ONT management control interface to manage the ONTs (ONUs) connected to the OLT for communication. Herein, since the OLT and the ONTs (ONUs) communicate with each other by means of different modes, the ONT management control interface must supply different modes.

A protocol defined by the ONT management control interface, which has been defined by the existing G.983.2, operates on the basis of an ATM. Accordingly, an ONT management control packet is transmitted by means of an ATM cell (reference to FIG. 3) with a length of 53 bytes. Herein, VPI/VCI values, which are channel addresses for the ONT management control interface, are shown in the ATM header. Further, a cell payload transmits information such as the transaction correlation identifier 302, the message type 303, the device identifier 304, the message identifier 305, the message contents 306, and the AAL5 trailer 307. As described above, the ONT management control interface defined by the existing G.983.2 can be just applied to the ONT (ONU) operated by an ATM mode.

However, the GPON is defined by and classified into an ONT management control interface of the GEM mode and an ONT management control interface of the ATM mode. Accordingly, the ONT management control interface of the ATM mode cannot be applied to the ONT (ONU) operated by an GEM mode.

As described above, a way capable of transmitting the ONT management control interface has not been considered in the GEM protocol. Accordingly, the GEM protocol is required to have a definition about a mechanism which can transmit management control interface information.

In general, there are two conventional methods for transmitting the OMCI information in a GPON supporting both a GEM payload and an ATM payload. One method is an in-band method in which a field is always assigned to a channel assigned to a header of a frame, etc. The other method is an out-of-band method in which a frame for the OMCI information is defined.

In the out-of-band method, the current G.983.2 intact can be used for the ATM mode, but an OMCI for a GEM mode must be newly defined.

In contrast, the in-band method has a limitation in a definition of the OMCI for the GEM mode, in that the OMCI of the GEM mode must use the G.983.2 standard intact or an OMCI field having the same size as that of an OMCI of the G.983.2 in order to use the current G.983.2, because the GPON supports both the GEM mode and the ATM mode. However, the in-band method has advantages not only because of always assigning a fixed channel, but also because of the compatibility with the standard because it does not define a new OMCI.

SUMMARY OF THE INVENTION

Accordingly an object of the present invention is to provide a GTC frame structure for ONT management control information transmission in Gigabit-capable passive optical network (GPON) that can transmit the management control information to an ONT supporting an ATM mode and an ONT supporting an GEM mode, and transmission method of the information.

The present invention provides a method for transmitting ONT management control information that can simultaneously support both an ATM mode and a GEM mode on the basis of an in-band method while supporting the existing G.983.2.

In order to accomplish the aforementioned objects, according to an of the present invention, there is provided a method for transmitting management control information from an OLT to an ONT in a Gigabit-capable passive optical network comprising the steps of: constructing a GTC frame which includes a PCBd portion having an OMCC field including either destination identifier information for supporting a GEM mode or destination identifier information for supporting a ATM mode, and a payload portion including data; and transmitting the GTC frame.

In order to accomplish the aforementioned objects, according to an aspect of the present invention, there is provided a method for transmitting management control information from an ONT to an OLT in a Gigabit-capable passive optical network comprising the steps of: constructing a GTC frame which includes a PCBd portion having an OMCC field including either destination identifier information for supporting a GEM mode or destination identifier information for supporting a ATM mode, and a payload portion in which data are included; and transmitting the GTC frame.

In order to accomplish the aforementioned objects, according to an aspect of the present, there is provided a GTC frame structure for transmitting management control information between an ONT and an OLT in a Gigabit-capable passive optical network comprising: a PCBd portion having an OMCC field which includes either destination identifier information for supporting a GEM mode or destination identifier information for supporting a ATM mode; and a payload portion including data.

A GPON according to the present invention simultaneously supports not only a cell-based transmission method (that is, an ATM mode) processing an ATM service, but also a GPON encapsulation method (that is, a GEM mode) processing packets having varied length in a time division multiplex (TDM) and an Ethernet service. This support is different from that of a broadband passive optical network (BPON), which is based on the G.983 series of which standardization has been completed as described above and operates on the basis of an ATM. Herein, in the ATM mode, transmission data is fitted to a GPON transmission convergence (hereinafter, referred to as a GTC) frame by the unit of a cell and then transmitted. Further, in the GEM mode, transmission data is fitted to a GTC frame by the unit of each GEM frame and transmitted.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. For the purposes of clarity and simplicity, description of known functions and configuration incorporated herein will be omitted as it may make the subject matter of the present invention unclear.

An ONT management control interface (hereinafter, referred to as an OMCI) is a protocol for an ONU (ONT) management, and it is a kind of an operations, administration and maintenance (hereinafter, referred to as an OAM) specification. According to the standard G.983.2, a field of an OMCI for a BPON can be classified into a configuration management, a fault management, a performance management, and a security management, etc. Furthermore, a method for sending and receiving a control message (that is an OMCI message), each message type, and a necessary attribute have been defined according to each field.

In other words, the OMCI can be thought of and referred to as a type of management system protocol for providing services of upper layers (above a GTC). Accordingly, since an OMCI of a GPON supports not only an ATM mode but also a GEM mode, it is necessary to establish an OMCI for the GEM mode. For this purpose, the present invention realizes it on the basis of the G.983.2.

Figure 5:
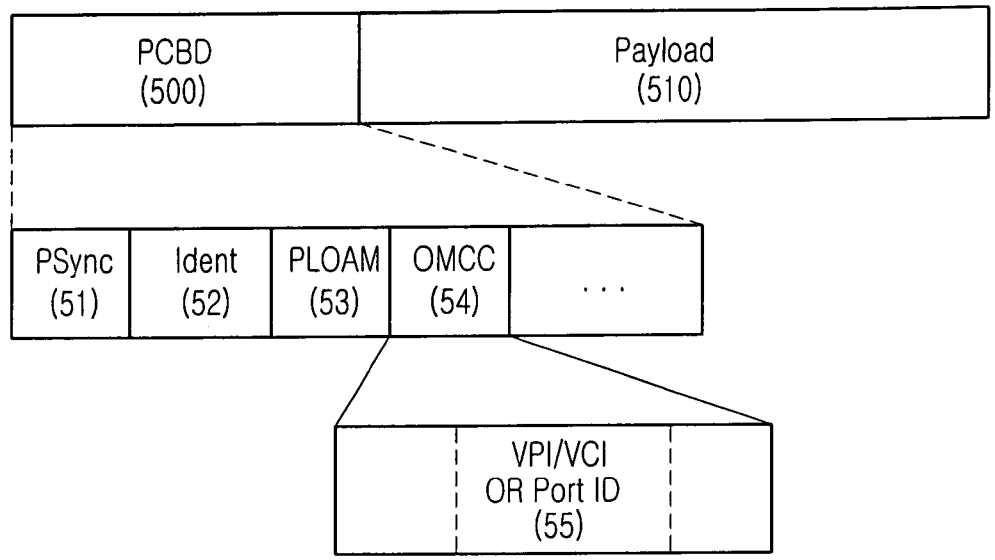
FIG. 5 is a view showing a structure of a GTC frame in a GPON according to an aspect of the present invention.

FIG. 5 is a view showing a structure of a GTC frame in a GPON according to an embodiment of the present invention. As shown in FIG. 5, an OMCI channel is added to a GPON transmission convergence (hereinafter, referred to as a GTC) frame structure defined by the "G.GPON.GTC".

First, the GTC frame in the GPON can be classified into a physical control block downstream (hereinafter, referred to as a PCBd) field 500 and a payload field 510. In the present invention, a construction for a downstream field from an OLT to an ONT employs the PCBd field 500 as an example. Also, the same construction can be employed in an upstream field from an ONT to an OLT.

In the GTC frame structure, the PCBd field 500 comprises a header including a PSync field 51 for general synchronization, an Ident field 52 representing a FEC use state, and a key-switching state for an indication of a frame having a particular length, a physical layer operations and maintenance (PLOAM) field 53, and a bandwidth allocation/report structure, etc.

Further, the payload field 510 includes data transmitted by the GTC frame.

According to the present invention and shown in FIG. 5, the PCBd field 500 includes an ONT management control channel (hereinafter, referred to as an OMCC) field 54 for transmitting OMCI information. Further, the OMCC field 54 includes a destination virtual path identifier (hereinafter, referred to as a VPI)/virtual channel identifier (hereinafter, referred to as a VCI) in order to support an ATM mode, or at least has a field 55 including a Port ID in order to support an GEM mode. To clarify, the present invention includes the destination VPI/VCI into the PCBd portion in order to support an ATM mode, or adds the OMCC field including the Port ID in order to support a GEM mode. Herein, the contents, size and position of the OMCC field will not be in detail described in the present invention, but it basically conforms to the G.983.2. That is, the transaction correlation identifier 302, the message type 303, the device identifier 304, the message identifier 305, and the message contents 306, all shown in FIG. 3 may be included.

Figure 1:
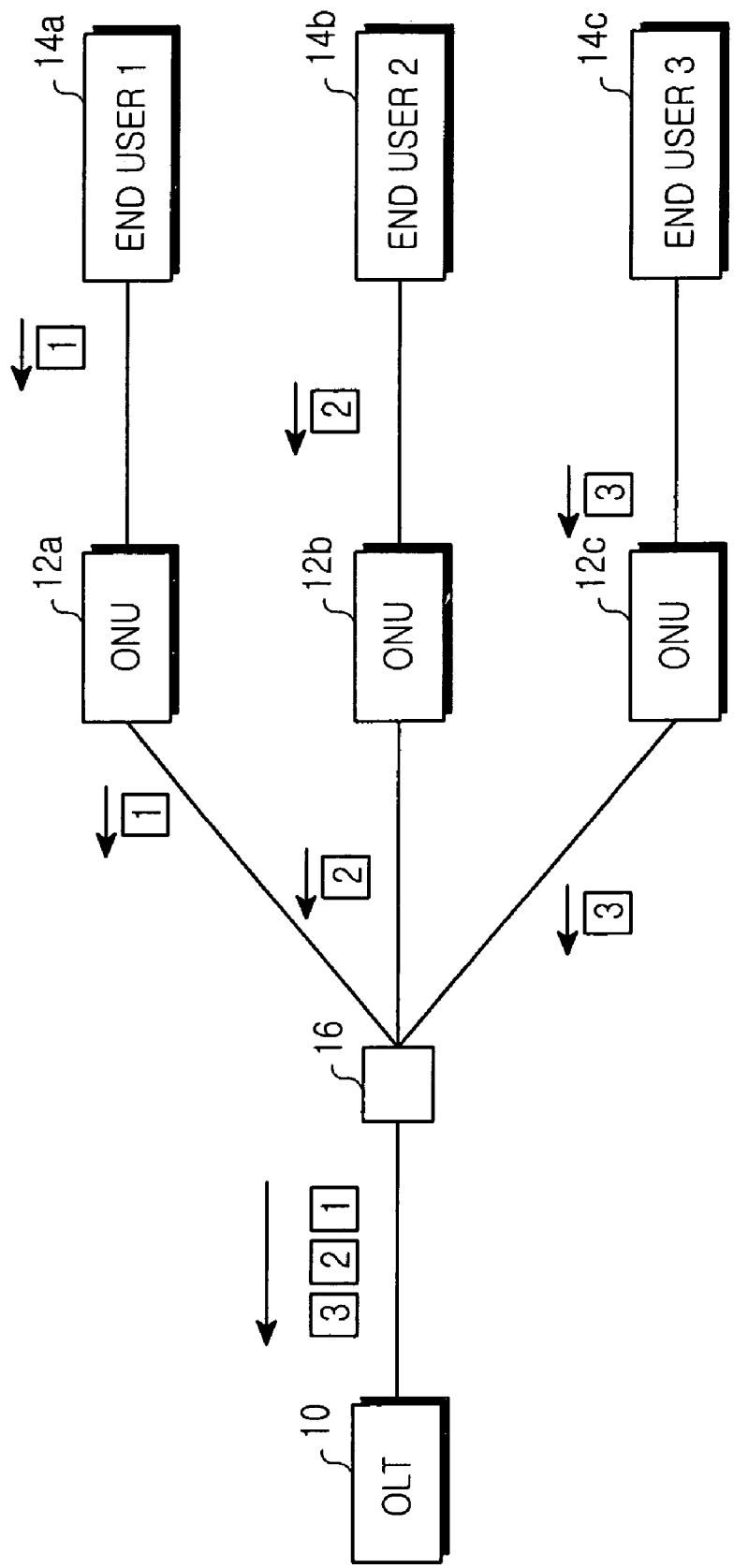
FIG. 1 is a block diagram of a conventional PON.
Figures 2, 3:
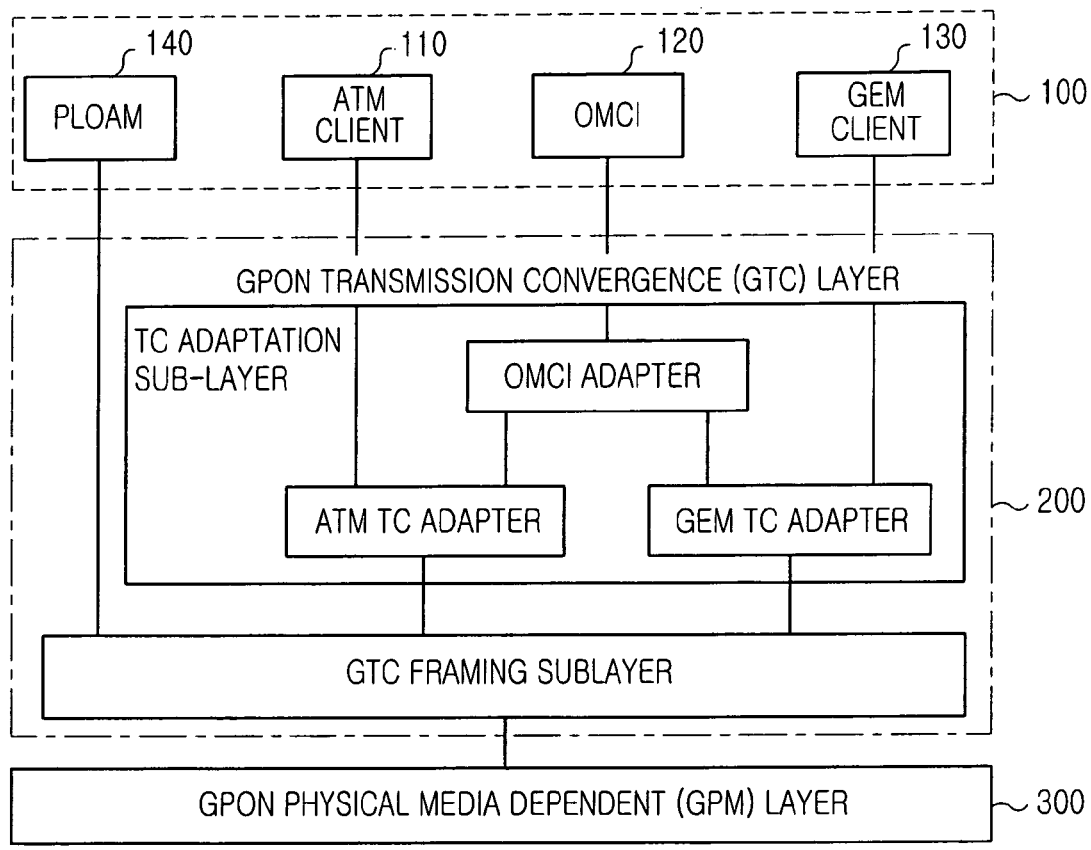
FIG. 2 is a view showing a protocol stack structure of a conventional GPON.
FIG. 3. is a view showing a structure of a frame transmitting ONT management control information of a BPON defined by the G.983.2.
Figure 4:
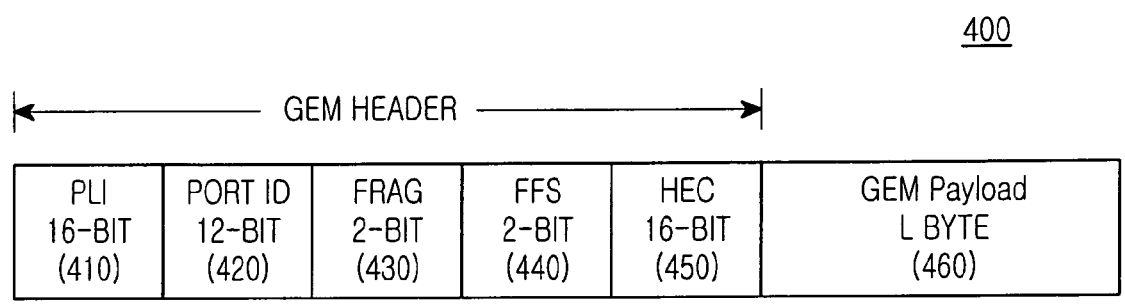
FIG. 4. is a view showing a structure of a frame in a GEM mode supporting a conventional TDM and Ethernet service.

Herein, since the frame shown in FIG. 3 is OMCI information for the ATM mode, a Port_ID is used in the case of OMCI information for the GEM mode.

Additionally, due to the fact that the OMCC field 54 is not always transmitted but may be inserted as occasion demands, a flag bit can be inserted, and this flag bit is necessary for representing whether a corresponding field has been inserted or not. This will be described in more detail with reference to FIG. 7.

Figure 6:
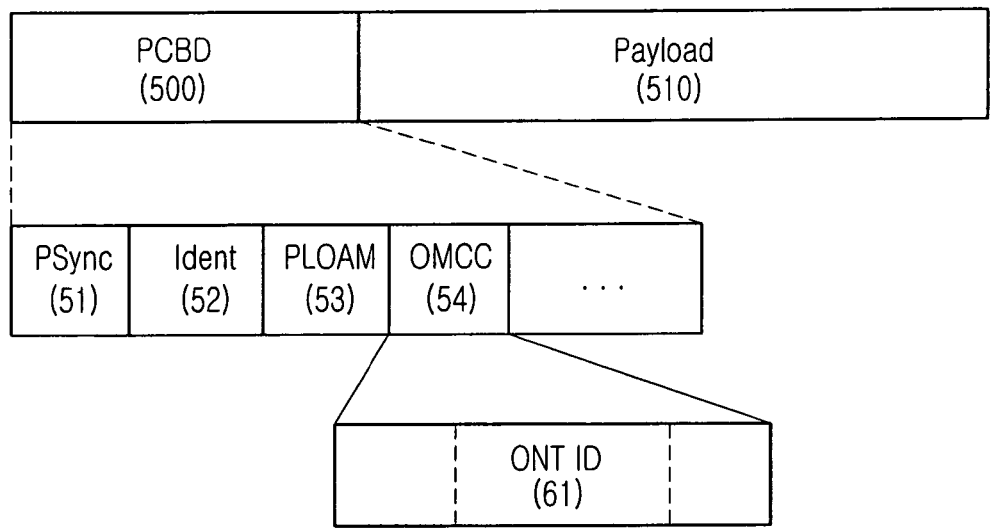
FIG. 6 is a view showing a structure of a GTC frame in a GPON according to another aspect of the present invention.

FIG. 6 is a view showing as tructure of a GTC frame in a GPON according to another embodiment of the present invention. As shown in FIG. 6, an OMCI channel is added to a GTC frame structure defined by the "G.GPON.GTC". First, the GTC frame in the GPON is classified into a physical control block downstream (hereinafter, referred to as a PCBd) field 500 and a payload field 510.

In the GTC frame structure, the PCBd field 500 is a header including a PSync field 51 for general synchronization, an Ident field 52 representing a FEC use state and a key-switching state for an indication of a frame having a long length, a physical layer operations and maintenance (PLOAM) field 53, and a bandwidth allocation/report structure, etc.

Finally, the payload field 510 includes data transmitted by the GTC frame. In the present invention, the PCBd field 500 includes an ONT management control channel (hereinafter, referred to as an OMCC) field 54 for transmitting OMCI information.

Herein, according to an aspect to of the present invention, the OMCC field 54 uses an ONU_ID 61, instead of a VPI/VCI or a Port_ID, as an identifier for classifying a destination of the OMCC field 54.

That is, since an OMCI in the OMCC field 54 employs an ONT(or ONU) as a control subject, the OMCC field 54 uses the ONU_ID 61 as the destination identifier.

One particular difference from the illustrations shown in FIG. 5 and FIG. 6 is that different destination identifiers are used according to the ATM mode or the GEM mode. In the present aspect of the invention, one ID is used regardless of support modes, so that a field format of the OMCC can be simplified. Furthermore, according to this aspect of the invention, since the ONU_ID can be extracted directly from the GTC framing sub layer shown in FIG. 2 without passing through a TC adaptation sub layer.

As described above, the OMCC field including the ONU_ID field 61 is added to the PCBd field 500 of the GTC frame. Herein, a contents, size and position of the OMCC field will not be in detail described in the present invention, but it basically conforms to the G.983.2. That is, the transaction correlation identifier 302, the message type 303, the device identifier 304, the message identifier 305, and the message contents 306 shown in FIG. 3 may be included.

Further, since the OMCC field 54 is not always transmitted but may be inserted as occasion demands, a flag bit can be inserted, which is necessary for representing whether a corresponding field has been inserted or not. This will be described in more detail with reference to FIG. 7.

Figure 7:
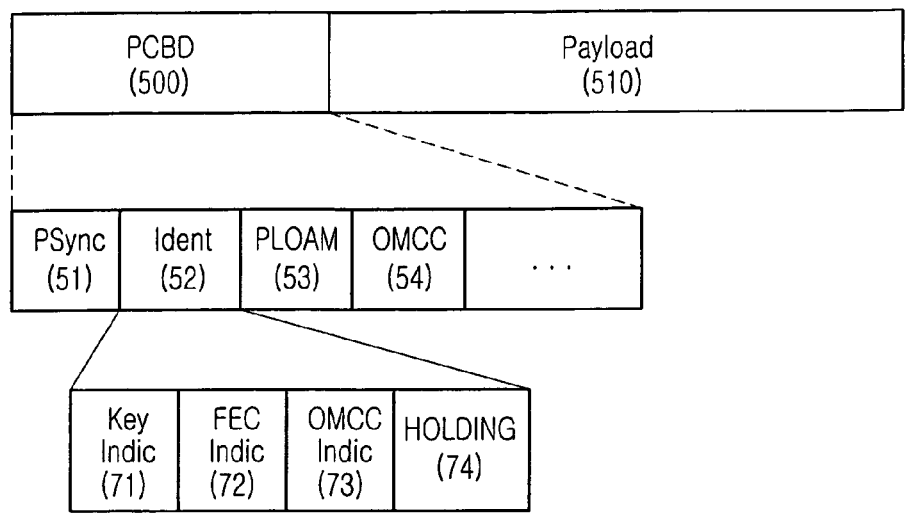
FIG. 7 is a view showing a structure of a GTC frame into which a flag field for representing whether an OMCC field is included or not is inserted, in a GPON according to an aspect of the present invention.
Figure 8:
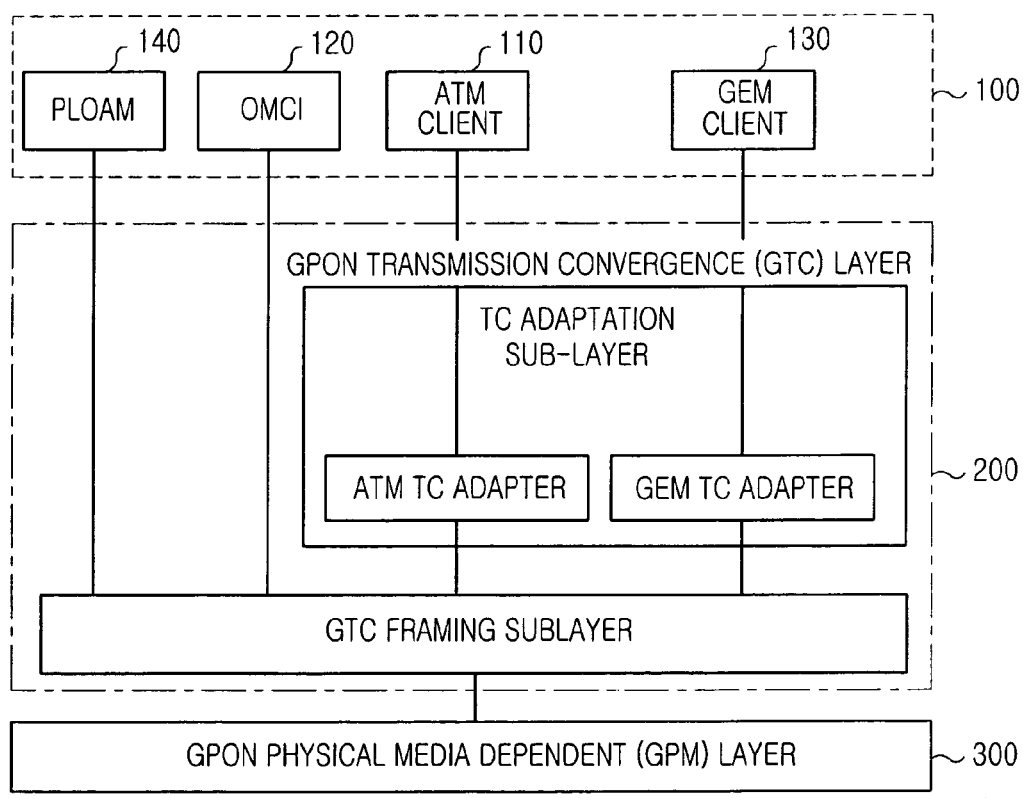
FIG. 8 is a view showing a protocol stack structure in the GPON according to the aspect shown in FIG. 6.

FIG. 7 shows a structure of a GTC frame into which a flag field for representing whether an OMCC field is included or not is inserted, in a GPON according to an embodiment of the present invention.

According to another aspect of the invention, an OMCC indic field 73 is added to the Ident field 52 described with reference to FIGS. 5 and 6 so that an existence or absence of insertion of the OMCC field can be determined according to a value of the OMCC indic field 73. Further, a key indic field 71 represents information about a key-switching, and a forward error control (hereinafter, referred to as a FEC) indic field 72 represents information about whether or not the FEC is used.

In the present invention as described above, by means of a GTC frame in which an OMCC field including OMCI information is added, a mechanism can be provided, which can exchange control information regarding an ATM mode client or a GEM mode client. In other words, in a GPON, an OLT can manage/control not only an ONT operated in an ATM mode, but also an ONT operated in an GEM mode.

A construction for downstream from an OLT to an ONT is described with reference to FIGS. 5 to 8, but a construction for upstream from an ONT to an OLT can be also described by the same manner. In other words, in the case of upstream from an ONT to an OLT, a physical control block upstream (hereinafter, referred to as a PCBu) field having the same structure as that of the PCBd is employed. Accordingly, the description of FIGS. 5 to 8 is applied to the PCBu field.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting management control information from an optical line termination (OLT) to an optical network terminal (ONT) in a Gigabit-capable passive optical network (GPON), the method comprising the steps of:
   (a) constructing a GPON Transmission Convergence (GTC) frame that includes a physical control block downstream (PCBD) portion having an ONT management control channel (OMCC) field including:
   a destination identifier information for supporting a GPON encapsulation method (GEM mode), and a payload portion including data; and
   (b) transmitting the GTC frame.

2. The method as claimed in claim 1, wherein the PCBd portion further includes an ONT management control channel (OMCC) flag field for determining whether the OMCC field is inserted or not.

3. The method as claimed in claim 1, wherein, when a mode of the ONT is the GEM mode, a Port ID is used as the destination identifier information for supporting the GEM mode of the OMCC field.

4. The method as claimed in claim 1, wherein an ONT ID is used as the destination identifier information.

5. The method as claimed in claim 2, wherein one bit in an Ident field defined by the GTC frame (G.GPON.GTC) is used as the OMCC flag field.

6. A method for transmitting management control information from an optical line termination (OLT) to an optical network terminal (ONT) in a Gigabit-capable passive optical network (GPON), the method comprising the steps of:
   (a) constructing a GPON Transmission Convergence (GTC) frame that includes a physical control block downstream (PCBD) portion having an ONT management control channel (OMCC) field including a destination identifier information for supporting a ATM mode, and a payload portion including data; and
   (b) transmitting the GTC frame.

7. The method as claimed in claim 6, wherein, when a mode of the ONT is Asynchronous Transfer Mode (ATM), a virtual path identifier (VPI) and a virtual channel identifier (VCI) are used as the destination identifier information for supporting the ATM mode of the OMCC field.

8. The method as claimed in claim 6, wherein an ONT ID is used as the destination identifier information.

9. The method as claimed in claim 8, includes an ONT management control channel (OMCC) flag field for determining whether the OMCC field is inserted or not, and wherein one bit in an Ident field defined by the GTC frame (G.GPON.GTC) is used as the OMCC flag field.

10. A method for transmitting management control information from an optical network terminal (ONT) to an optical line termination (OLT) in a Gigabit-capable passive optical network (GPON), the method comprising the steps of:
 (a) constructing a GPON Transmission Convergence (GTC) frame which includes a physical control block downstream (PCBD) portion having an ONT management control channel (OMCC) field including either destination identifier information for supporting one of a GPON encapsulation method GEM mode and a destination identifier information for supporting a ATM mode, and a payload portion in which data are included; and
 (b) transmitting the GTC frame.

11. The method as claimed in claim 10, wherein the PCBd portion further includes an OMCC flag field for determining whether the OMCC field is inserted or not.

12. The method as claimed in claim 10, wherein, when a mode of the ONT is the GEM mode, a Port ID is used as the destination identifier information for supporting the GEM mode of the OMCC field.

13. The method as claimed in claim 10, wherein, when a mode of the ONT is the ATM mode, VPI/VCI are used as the destination identifier information for supporting the ATM mode of the OMCC field.

14. The method as claimed in claim 10, wherein an ONT ID is used as the destination identifier information.

15. The method as claimed in claim 11, wherein one bit in an Ident field defined by the GTC frame (G.GPON.GTC) is used as the OMCC flag field.

16. A GTC frame structure for transmitting management control information between an optical network terminal (ONT) and an optical line termination (OLT) in a Gigabit-capable passive optical network, the structure comprising:
 a physical control block downstream (PCBD) portion having an ONT management control channel (OMCC) field which includes destination identifier information for supporting one of a GPON encapsulation method (GEM mode)or a destination identifier information for supporting a ATM mode; and
 a payload portion including data.

17. The GTC frame structure as claimed in claim 16, wherein the PCBd portion further includes an ONT management control channel (OMCC flag) field for determining whether the OMCC field is inserted or not.

18. The GTC frame structure as claimed in claim 16, wherein, when a mode of the ONT is the GEM mode, a Port ID is used as the destination identifier information for supporting the GEM mode of the OMCC field.

19. The GTC frame structure as claimed in claim 16, wherein, when a mode of the ONT is the ATM mode, VPI/VCI are used as the destination identifier information for supporting the ATM mode of the OMCC field.

20. The GTC frame structure as claimed in claim 16, wherein an ONT ID is used as the destination identifier information.

21. The GTC frame structure as claimed in claim 17, wherein one bit in an Ident field defined by the GTC frame G.GPON.GTC) is used as the OMCC flag field.

* * * * *